(No Model.)
W. F. HARRIS.
FAUCET.
No. 503,477. Patented Aug. 15, 1893.
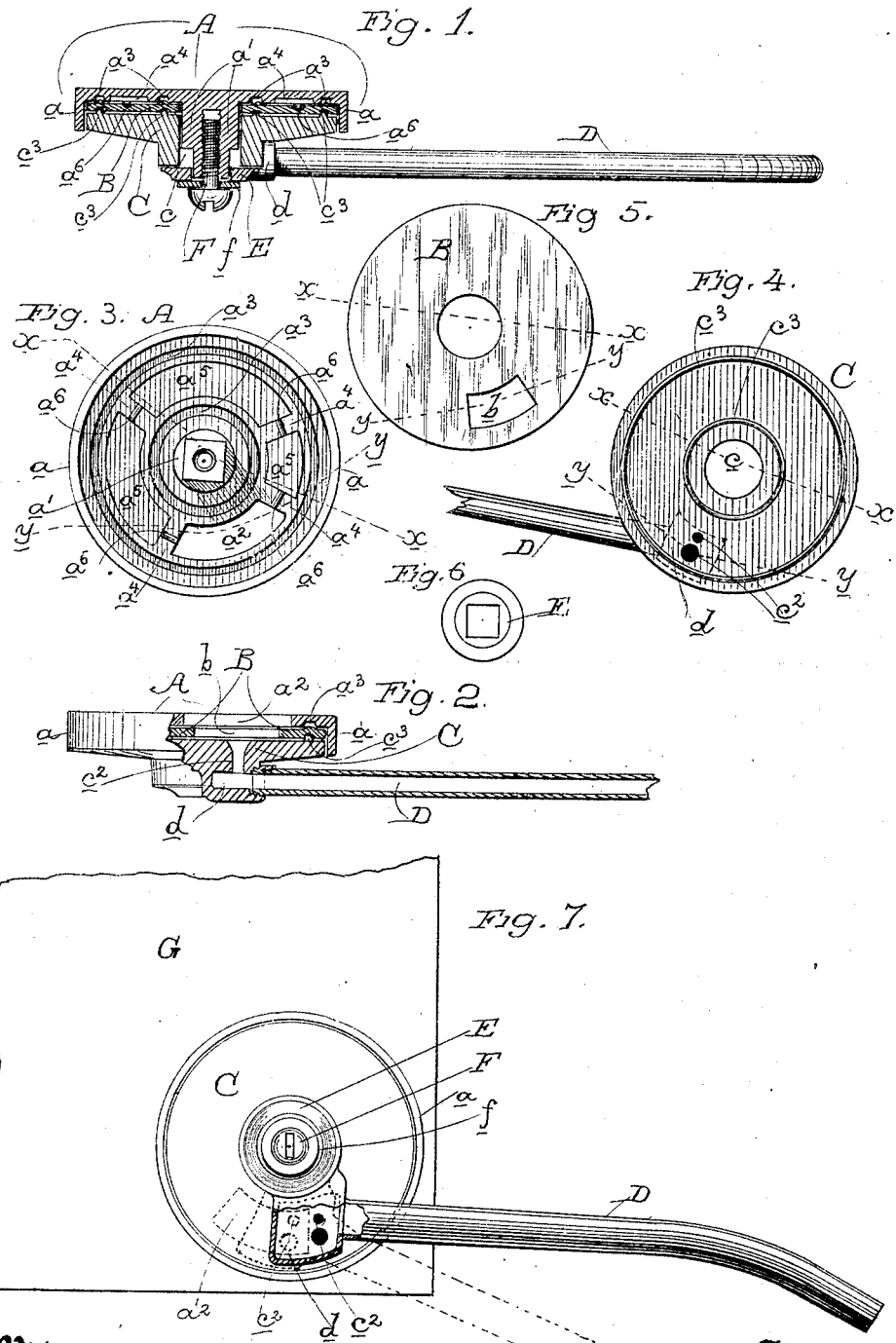
Witnesses
C. B. Howse
J. A. Bayless
Inventor
William F. Harris
By Dewey & Co.
atty

UNITED STATES PATENT OFFICE.

WILLIAM F. HARRIS, OF SAN FRANCISCO, CALIFORNIA.

FAUCET.

SPECIFICATION forming part of Letters Patent No. 503,477, dated August 15, 1893.

Application filed October 18, 1892. Serial No. 449,271. (No model.)

*To all whom it may concern:*

Be it known that I, WILLIAM F. HARRIS, a citizen of the United States, residing in the city and county of San Francisco, State of California, have invented an Improvement in Faucets; and I hereby declare the following to be a full, clear, and exact description of the same.

My invention relates to that class of faucets in which an oscillatory valve communicates with and is operated by the discharge pipe.

My invention consists in certain features of construction and combination of parts which will be hereinafter fully set forth.

The object of my invention is to provide a simple, tight and readily operated faucet, which while adapted for various uses, is especially applicable to, and is intended to be used in connection with oil cans for drawing off the contents.

Referring to the accompanying drawings for a more complete description of my invention, Figure 1 is a section of my faucet taken on the lines $x$—$x$ of the several parts shown in Figs. 3, 4 and 5. Fig. 2 is a part elevation and part section, the sectional part being on the lines $y$—$y$ of the several parts shown in Figs. 3, 4 and 5. Fig. 3 is a plan of the inside of the valve seat. Fig. 4 is a plan of the inside of the valve. Fig. 5 is a plan of the washer. Fig. 6 is a plan of the holding washer E. Fig. 7 is a view showing the application of my faucet to a can, parts being broken to show the ports.

A is the valve seat. It consists of a plate or disk having a flat back, and an outwardly extending rim flange $a$. It is provided or formed with a central hub $a'$, the extremity of which is square in cross section and is internally threaded. In the valve seat is made the port $a^2$. The inner surface of the valve is formed with concentric grooves $a^3$, one near the rim and the other near the hub. It is also formed with radial ribs $a^4$ leaving between them sector shaped cavities or depressions $a^5$. On the ribs are formed the cross beads $a^6$.

B is a washer of leather, cork, soft metal or any suitable compressible material. Cork will be found good in practice. It is centrally perforated and is fitted over the hub $a'$ of the seat A, and lies snugly within said seat, resting on its inner surface. It has a port $b$ which coincides with the port $a^2$ of the valve seat.

C is the valve, consisting of a disk, having a central perforation $c$ fitted over the hub $a'$ of the valve seat. It has a port or ports $c^2$, (here shown as two in number) which open out into the chamber $d$ on the outer side of the valve and into which the discharge pipe D is let. The inner surface of the valve is formed with concentric beads $c^3$. The square outer end of hub $a'$ of the valve seat projects through and beyond the valve and receives on its extremity the square socketed holding washer E, which rests upon the valve and is secured by a screw F, which passes into the internally threaded end of hub $a'$, said screw bearing on the washer E through the intervention of a small washer $f$. Thus the valve is tightened and held to its seat. Its oscillation on hub $a'$ will not loosen the washer E, which being square socketed, cannot turn, and, therefore, the screw F is stationary and there will be no tendency to loosen. By setting the screw in tightly, the valve is pressed in upon the washer B, which latter is thus held stationary in its seat.

In the use of a faucet of this kind, especially in its application to the drawing of oil, it is a difficult matter to seat the valve with sufficient tightness to prevent leakage.

In my faucet the washer B is of prime importance, and the construction of the inner surfaces of the valve seat and of the valve is for the purpose of holding the washer tightly, and of pressing it in so snugly that leakage is avoided. These objects are effected by the material of the washer being pressed into the concentric grooves $a^3$ of the valve seat, into the radial ribs $a^4$ thereof, and into the beads $a^6$ of said ribs. The concentric beads $c^3$ of the valve lie over the plane of the concentric grooves $a^3$ of the seat, and they press into the washer and press said washer into the grooves. The beads and grooves serve as barriers and prevent leakage, and the beads $c^3$ being annular, do not prevent the oscillations of the valve. The radial ribs $a^4$ and their cross beads $a^5$ serve also as barriers, but they also act as stops to prevent the washer B from turning, and to connect it firmly with the seat A.

The application of my faucet to the oil can is shown in Fig. 7. It is preferably located at the lower right hand corner of the can G. The seat A is soldered to the can by its flat surfaced back, and a suitable hole is made in the can, back of the port $a^2$. The ports are so located that when the discharge pipe D is turned downwardly a little, the oil will flow out. When raised, the oil will be cut off; and the pipe D can be turned up farther to lie out of the way alongside of the can. The whole faucet is small, compact, and being quite flat is not in the way. The port in the seat may be made large enough to permit the ready refilling of the can through it, if desired.

Having thus described my invention, what I claim as new, and desire to secure by Letters Patent, is—

1. A faucet consisting of a fixed ported valve seat the inner surface of said seat having the concentric grooves spaced apart by radial ribs having cross beads said ribs and the walls of said grooves forming segmental chambers $a^2$, a ported oscillatory valve fitted to said seat upon its hub and having a discharge pipe attached, said valve having on its inner surface the concentric beads and the intervening ported compressible washer, substantially as herein described.

2. A faucet consisting of a ported valve seat having a central hub, the inner surface of said seat having the concentric grooves, a ported oscillatory valve fitted to said seat upon its hub, and having a discharge pipe attached, said valve having on its inner surface the concentric beads, and the intervening ported compressible washer substantially as described.

3. A faucet consisting of a ported valve seat having a central hub, the inner surface of said seat having the radial ribs, a ported oscillatory valve fitted to said seat upon its hub, and having a discharge pipe attached, and the intervening compressible washer substantially as described.

4. A faucet consisting of a ported valve seat having a central hub, the inner surface of said seat having the radial ribs with cross beads, a ported oscillatory valve fitted to said seat upon its hub and having a discharge pipe attached, and the intervening compressible washer substantially as described.

5. A faucet consisting of a ported valve seat having a central hub, the inner surface of said seat having the concentric grooves, and the radial ribs with cross beads, a ported oscillatory valve fitted to said seat upon its hub and having a discharge pipe attached, said valve having on its inner surface the concentric beads, and the intervening ported compressible washer substantially as described.

In witness whereof I have hereunto set my hand.

WILLIAM F. HARRIS.

Witnesses:
S. H. NOURSE,
J. A. BAYLESS.